(12) United States Patent
Gao et al.

(10) Patent No.: US 12,123,077 B2
(45) Date of Patent: Oct. 22, 2024

(54) HIGH-TOUGHNESS HEAT-RESISTANT ALUMINUM ALLOY ARMATURE MATERIAL AND PREPARATION METHOD THEREOF

(71) Applicant: SHANGHAI JIAO TONG UNIVERSITY, Shanghai (CN)

(72) Inventors: Haiyan Gao, Shanghai (CN); Haiyang Lv, Shanghai (CN); Peng Peng, Shanghai (CN); Yufei Wang, Shanghai (CN); Mengmeng Wang, Shanghai (CN); Yun Wu, Shanghai (CN); Chi Zhang, Shanghai (CN); Jun Wang, Shanghai (CN); Baode Sun, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 18/467,734

(22) Filed: Sep. 15, 2023

(65) Prior Publication Data
US 2024/0191324 A1    Jun. 13, 2024

Related U.S. Application Data

(63) Continuation of application No. PCT/CN2021/105093, filed on Jul. 8, 2021.

(30) Foreign Application Priority Data

Mar. 15, 2021    (CN) .......................... 202110278614.6

(51) Int. Cl.
*C22C 21/00*    (2006.01)
*B22F 9/08*    (2006.01)
(Continued)

(52) U.S. Cl.
CPC .............. *C22C 21/00* (2013.01); *B22F 9/082* (2013.01); *B22F 10/28* (2021.01); *B33Y 10/00* (2014.12);
(Continued)

(58) Field of Classification Search
CPC ........ C22C 21/00; C22C 1/0416; C22C 1/026
See application file for complete search history.

(56) References Cited

U.S. PATENT DOCUMENTS

| 2008/0050268 | A1 | 2/2008 | Daech |
| 2013/0340569 | A1 | 12/2013 | Tetyukhin et al. |
| 2020/0024760 | A1 | 1/2020 | Mann et al. |

FOREIGN PATENT DOCUMENTS

| CN | 108559875 A | 9/2018 |
| CN | 110343912 A | * 10/2019 |

(Continued)

OTHER PUBLICATIONS

Internation Search Report of PCT/CN2021/105093, Mailed Nov. 29, 2021.

*Primary Examiner* — Brian D Walck
*Assistant Examiner* — Austin Pollock
(74) *Attorney, Agent, or Firm* — True Shepherd LLC; Andrew C. Cheng

(57) ABSTRACT

A method for preparing high-toughness heat-resistant aluminum alloy armature material, comprises: heating and melting an aluminum ingot into an aluminum liquid; adding the following elements to the aluminum solution in mass percent: Ce 6-12%, Y 5-9.5%, Zr 0.5-3%, Mg 0.1-2.5%, X 0.15-2.5%, Fe 0.15-0.25%, Mn 0.05-0.15%, and Si 0.1-0.5%; forming an alloy solution and casting same into an alloy ingot; processing the alloy ingot into spherical alloy powder; subjecting the spherical alloy powder to selective laser melting and solidification forming to produce nanoscale $Al_{11}Ce_3$, $Al_3(Y, Zr)$, and/or $Al_3X$ intermetallic com-
(Continued)

pounds distributed in a net-like skeleton structure in an aluminum matrix. The material of the present disclosure has low density, high-temperature resistance, high energy absorption rate and excellent electrical conductivity, and excellent mechanical properties at room temperature and high temperature.

6 Claims, 2 Drawing Sheets

(51) Int. Cl.
  *B22F 10/28* (2021.01)
  *B33Y 10/00* (2015.01)
  *B33Y 40/10* (2020.01)
  *B33Y 80/00* (2015.01)
  *C22C 1/02* (2006.01)
  *C22C 1/04* (2023.01)
(52) U.S. Cl.
  CPC ............... *B33Y 40/10* (2020.01); *B33Y 80/00* (2014.12); *C22C 1/02* (2013.01); *C22C 1/0416* (2013.01); *B22F 2009/0824* (2013.01); *B22F 2009/0836* (2013.01); *B22F 2202/13* (2013.01); *B22F 2304/10* (2013.01); *B22F 2998/10* (2013.01); *B22F 2999/00* (2013.01)

(56) References Cited

FOREIGN PATENT DOCUMENTS

| | | | |
|---|---|---|---|
| CN | 111496244 A | 8/2020 | |
| CN | 112795818 A * | 5/2021 | ............. B22F 3/105 |

* cited by examiner

HIGH-TOUGHNESS HEAT-RESISTANT ALUMINUM ALLOY ARMATURE MATERIAL AND PREPARATION METHOD THEREOF

CROSS-REFERENCE TO RELATED APPLICATIONS

This application is a continuation of International Patent Application No. PCT/CN2021/105093 with a filing date of Aug. 7, 2021, designating the United States, now pending, and further claims priority to Chinese Patent Application No. 202110278614.6 with a filing date of Mar. 15, 2021. The content of the aforementioned applications, including any intervening amendments thereto, are incorporated herein by reference.

TECHNICAL FIELD

The present disclosure relates to the field of heat-resistant aluminum alloy materials, and in particular, to a high-toughness heat-resistant aluminum alloy armature material and a method thereof.

BACKGROUND ART

An electromagnetic railgun is a new concept of kinetic energy weapon which uses electromagnetic energy to drive the armature with current to slide to ultra-high speed and propel the projectile to launch. Compared with conventional artillery, it has the advantages of high initial velocity, high power, high safety, strong controllability, simple operation, and high cost-effective ratio, so it has great strategic and tactical value in a future war. With the development of electromagnetic railgun, its service life has become one of the difficult technical problems. During the process of launching the armature of an electromagnetic railgun, the sliding electrical contact between the armature and the track is very poor, and complex mechanical, thermal, and electrical effects and strong side impact forces will occur between the armature and rail interfaces. Therefore, improving the comprehensive performance of the armature material has become a key technology for electromagnetic railguns.

At present, the armature material of electromagnetic railguns usually adopts aluminum alloy with low density. However, aluminum alloy materials have several major problems that are difficult to solve: 1, a large number of precipitates with poor thermal stability exist in the existing alloy microstructure, which grow up gradually and lose their precipitation strengthening effect at high temperatures, and it is difficult to control the microstructure by traditional means to inhibit the appearance of a large number of these precipitates; 2, the casting properties and mechanical properties and electrical conductivity of the alloy processed and formed by conventional means are difficult to balance; and 3, the room temperature and high-temperature properties of the alloy are difficult to balance. These aluminum alloy materials still do not meet the requirement of ultra-high-speed sliding on electromagnetic railgun pivots. In addition, the wear resistance and high-temperature ablation resistance of the material can not meet the actual needs of the electromagnetic railgun without significantly reducing the thermal conductivity and electrical conductivity. Therefore, the research on new armature materials with high toughness, excellent electrical conductivity, wear resistance and ablation resistance, and high-temperature resistance has become the development direction in the future, which is the most reliable way to solve the problem of armature material failure under different conditions of the electromagnetic railgun.

According to the mechanism of armature temperature rise of electromagnetic railgun, the selection of armature material should be considered from the following aspects: in order to minimize the mass of armature, the density of armature material should be lower to improve the launch efficiency; the armature material has high-temperature resistance and high energy absorption rate, so as to increase the critical temperature of contact point transfer and prevent arc and softening; it has high conductivity to reduce the generation of ohmic heat and ensure good heat dissipation. The armature material has the following characteristics: during the launching process, the armature is in the current loop, and a large current flows through the armature, accompanied by the phenomenon of temperature rise and melting; when the contact state of the pivot interface is poor, the transition and ablation will occur, and further, the planing of the pivot material will occur; armature is the main force component in the process of launching, which is combined with a warhead and projectile support to form an electromagnetic rail projectile, so, the armature mass should be as small as possible to improve the terminal damage ability of the warhead. At present, the aluminum alloy conductor materials reported cannot meet the requirements of electromagnetic railgun armature materials in terms of strength and heat resistance and need to further improve the comprehensive performance and high-temperature stability.

SUMMARY OF THE INVENTION

In view of the deficiencies in the prior art, it is an object of the present disclosure to provide a high-toughness heat-resistant aluminum alloy armature material and a preparation method thereof.

In one aspect, a method for preparing a high-toughness heat-resistant aluminum alloy armature material is provided, which comprises:

S1, under the protection of an atmosphere, heating and melting an aluminum ingot into an aluminum liquid at a temperature of 760° C.-780° C.;

S2, adding the following elements in mass percentage to the aluminum liquid: Ce 6.00%-12.00%, Y 5.00%-9.50%, Zr 0.50%-3.00%, Mg 0.10%-2.50%, X 0.15%-2.50%, Fe 0.15%-0.25%, Mn 0.05%-0.15%, and Si 0.10%-0.50%, wherein the content of other impurities is less than 0.1%; adjusting contents of the elements according to a pre-set composition, degassing and deslagging to form alloy liquid, and then casting the formed alloy liquid into an alloy ingot;

S3, processing the obtained alloy ingot into spherical alloy powder; and

S4, subjecting the spherical alloy powder to selective laser melting and solidification forming to produce nano-scale $Al_{11}Ce_3$, $Al_3(Y, Zr)$, and/or $Al_3X$ intermetallic compounds distributed in a net-like skeleton structure in an aluminum matrix, namely, obtaining the high-toughness heat-resistant aluminum alloy armature material.

Preferably, in said S2, the following elements are added to the aluminum solution in mass percentage: Ce 8.00%-10.00%, Y 7.50%-9.50%, Zr 0.65%-1.00%, Mg 1.50%-2.50%, X 0.15%-0.50%, Fe 0.15%-0.20%, Mn 0.05%-0.10%, and Si 0.10%-0.25%; wherein X is any one or a mixture of more selected from a group consisting of Yb, Er, La, and Sc, and the content of other impurities is less than 0.1%.

Preferably, in said S2, the following elements are added to the aluminum solution in mass percentage, wherein said X is any one or a mixture of more selected from a group consisting of Yb, Er, La, or Sc.

Preferably, in said subjecting the spherical alloy powder to selective laser melting and solidification forming of S4, the following process parameters are adopted: laser power 260 W-350 W, scanning layer thickness 10 μm-30 μm, and input energy density 50 J/mm$^3$-90 J/mm$^3$. Within the above-mentioned process parameters, intermetallic compounds such as Al$_{11}$Ce$_3$, Al$_3$(Y, Zr), and/or Al$_3$X with a net-like skeleton structure and good thermal stability.

Preferably, in said processing the obtained alloy ingot into spherical alloy powder of S3, the alloy ingot is processed into spherical alloy powder by plasma rotary electrode atomization or gas atomization, and argon or helium gas is introduced for gas protection during the processing.

Preferably, in said processing the alloy ingot into spherical alloy powder by plasma rotary electrode atomization or gas atomization of S3,
- a rotation speed of the plasma rotary electrode atomization is 40000 rpm-50000 rpm; and
- the working gas pressure of the gas atomization is 6 MPa-10 MPa.

Preferably, in said processing the obtained alloy ingot into spherical alloy powder of S3, the spherical powder has a particle size of 15 μm-65 μm, an average particle size of 45 μm-55 μm, and sphericity of more than 95%.

In another aspect, a high-toughness heat-resistant aluminum alloy armature material prepared by the above method is provided.

Preferably, high-toughness heat-resistant aluminum rare earth aluminum alloy material has a packing fraction of more than 99% and a density of 2.75 g/cm$^3$-2.90 g/cm$^3$.

Preferably, the high-toughness heat-resistant aluminum alloy armature material has a yield strength of 270 MPa-350 MPa, a tensile strength of 400 MPa-450 MPa, and an elongation of 10%-12% at room temperature;

the high-strength heat-resistant rare earth aluminum alloy material has a yield strength of 160 MPa-200 MPa, a tensile strength of 220 MPa-280 MPa, and an elongation of more than 15% at above 400° C.

Compared with the prior art, the present disclosure has at least one beneficial effect as follows:

According to the above-mentioned method of the present disclosure, by using a selective laser melting process to process and shape, the cooling rate is very fast, thereby forming nano-scale intermetallic compounds such as Al$_{11}$Ce$_3$, Al$_3$(Y, Zr) and/or Al$_3$X, which have a net-like skeleton structure and are uniformly distributed in an aluminum matrix, with good thermal stability, so that the prepared material has the features of low density, high toughness, excellent electrical conductivity, wear resistance and ablation resistance, and high-temperature resistance, and the problems of softening and ablation during the operation of an armature material are solved.

The above method of the present disclosure uses a laser as the energy source, and during the processing, the metal powder is completely melted by the laser, without the need for a bonding agent, and is directly formed. The formed parts have high accuracy and excellent mechanical properties.

According to the above-mentioned method of the present disclosure, it is possible to directly obtain a solid part of any complex shape by using a metal powder according to a three-dimensional model of the part without any tooling fixture and mold, so as to realize a new material processing concept of "net shaping"; it is especially suitable for manufacturing parts with complicated inner cavity structure, which shortens the post-treatment time and steps and improves processing efficiency.

The high-toughness heat-resistant aluminum alloy material prepared by the above-mentioned method of the present disclosure has great development prospects in weight-sensitive application fields, the defense military industries, and aerospace fields.

BRIEF DESCRIPTION OF THE DRAWINGS

Other features, objects, and advantages of the present disclosure will become more apparent from reading the detailed description of non-limiting embodiments with reference to the following drawings.

DETAILED DESCRIPTION OF PREFERRED EMBODIMENTS

The following will provide a detailed explanation of the present disclosure in conjunction with specific examples. The following examples will assist those skilled in the art in further understanding the present disclosure but do not limit it in any form. It should be noted that several variations and modifications can be made by a person skilled in the art without departing from the inventive concept. These are all within the scope of the present disclosure.

Example 1

Figure 1:
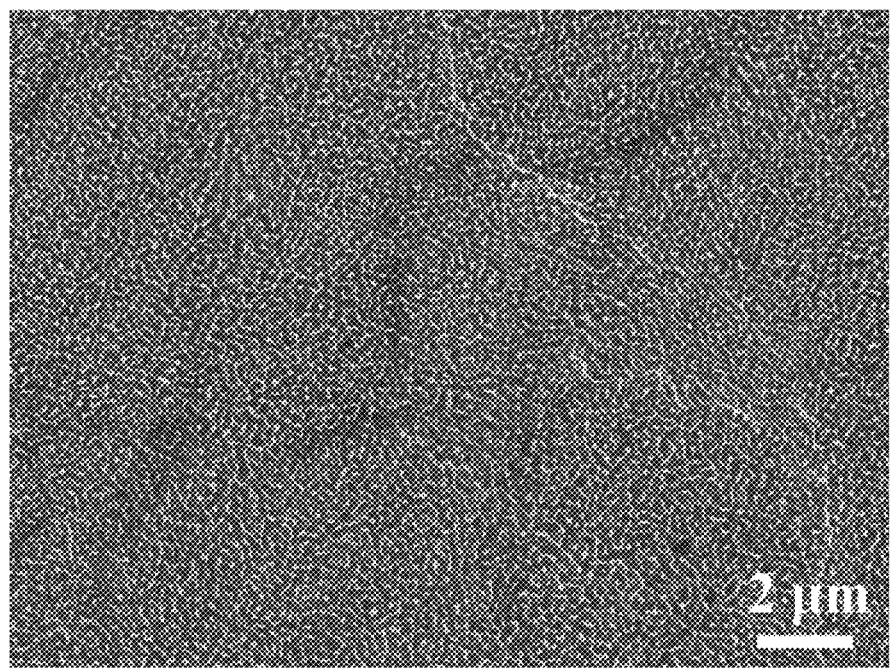
FIG. 1 is an image of the microscopic structure of a high-toughness heat-resistant aluminum alloy armature material in accordance with a preferred embodiment of the present disclosure.
Figure 2:
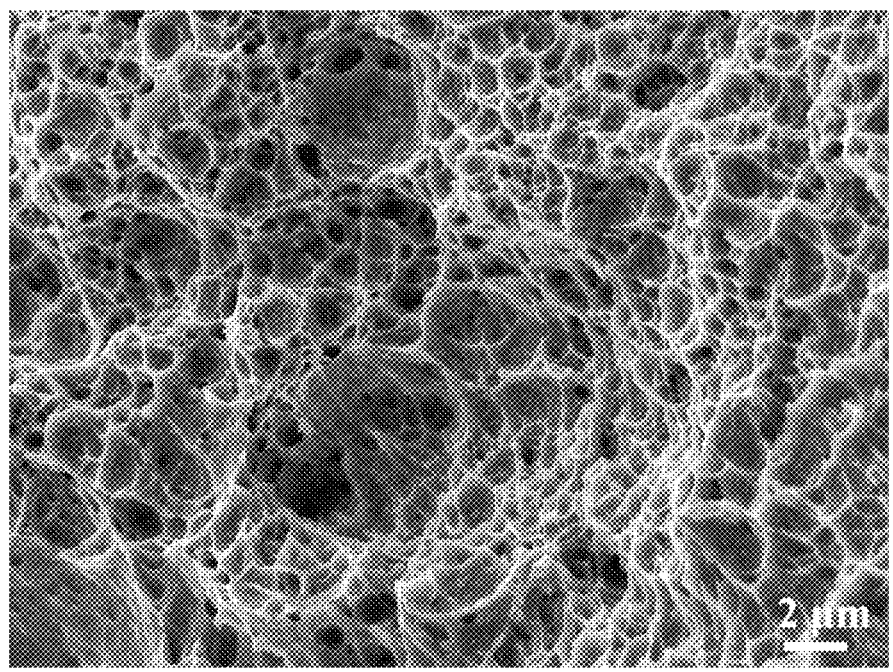
FIG. 2 is an image of the tensile fracture morphology of a high-toughness heat-resistant aluminum alloy armature material according to a preferred embodiment of the present disclosure.

The present example provides a method for preparing a high-toughness heat-resistant aluminum alloy armature material comprising:
- S1. Under the protection of high-purity argon, the aluminum ingot was heated and melted in an induction electric furnace to form aluminum liquid at a temperature of 770° C.
- S2. The following elements in mass percentage were added to the aluminum liquid: Ce 12.00%, Y 5.00%, Zr 0.50%, Mg 0.60%, La 0.15%, Fe 0.15%, Mn 0.05%, and Si 0.10%, with the content of other impurities being less than 0.1%; the contents of the elements were adjusted according to a preset composition, the mixture is subjected to degassing, and deslagging to form alloy liquid, and then the formed alloy liquid was cast into an alloy ingot.
- S3. The alloy ingot was processed into spherical alloy powder by using a plasma rotary electrode atomization method and argon gas was introduced for gas protection at a working speed of 40000 rpm; the spherical powder has a particle size of 20 μm-63 μm, an average particle size of 45.2 μm, and a sphericity of more than 98%.
- S4. The spherical alloy powder was subjected to rapid melting and solidification by selective laser melting and forming method; among them, the selective laser melting forming method adopted the following process parameters: laser power 350 W, scanning layer thickness 30 μm, and input energy density 70.4 J/mm$^3$. The spherical alloy powder was rapidly melted and solidified to form a high-toughness heat-resistant aluminum alloy armature material. Nano-scale $Al_{11}Ce_3$, $Al_3(Y, Zr)$ intermetallic compounds with good thermal stability were formed in the aluminum matrix. The microstructure image is shown in FIG. 1. It can be seen from FIG. 1 that the white intermetallic compounds are of net-like skeleton structure and uniformly distributed in the aluminum matrix, which indicates that the formed microstructure is dense and free of defects. The high-toughness heat-resistant aluminum alloy armature material has a density of more than 99.8% and a density of 2.79 g/cm³. It was tested to have a yield strength of 284 MPa, a tensile strength of 400 MPa, and an elongation of 10.2% at room temperature. The tensile fracture morphology is shown in FIG. 2. The fine tensile dimples can be seen in FIG. 2, which indicates that the material exhibits ductile fracture with a good matching of strong plasticity. The alloy has a yield strength of 170 MPa, a tensile strength of 230 MPa, and an elongation of 15.6% at 400° C.

Example 2

The present example provides a method for preparing a high-toughness heat-resistant aluminum alloy armature material comprising:
S1. Under the protection of high-purity argon, the aluminum ingot was heated and melted in an induction electric furnace to form aluminum liquid at a temperature of 780° C.
S2. The following elements in mass percentage were added to the aluminum liquid: Ce 6.00%, Y 9.50%, Zr 0.50%, Mg 0.10%, Yb 0.20%, Fe 0.25%, Mn 0.10%, and Si 0.10%, with the content of other impurities being less than 0.1%; the contents of the elements were adjusted according to a preset composition; the mixture was subjected to e degassing and deslagging to form alloy liquid, and then the formed alloy liquid was cast into an alloy ingot.
S3. The alloy ingot was processed into spherical alloy powder by using a plasma rotary electrode atomization method and argon gas was introduced for gas protection at a working speed of 45000 rpm; the spherical powder has a particle size of 15 μm-60 μm, an average particle size of 48.3 μm, and a sphericity of more than 98%.
S4. The spherical alloy powder was subjected to rapid melting and solidification by selective laser melting and forming method; among them, the selective laser melting forming method adopted the following process parameters: laser power 330 W, scanning layer thickness 20 μm, and input energy density 64.4 J/mm³. The spherical alloy powder was rapidly melted and solidified to form a high-toughness heat-resistant aluminum alloy armature material. Nano-scale $Al_3(Y, Zr)$ and $Al_{11}Ce_3$ intermetallic compounds were formed in the aluminum matrix, which have a net-like skeleton structure and good thermal stability. The high-toughness heat-resistant aluminum alloy armature material has a density of more than 99.6% and a density of 2.83 g/cm³. It was tested to have a yield strength of 284 MPa, a tensile strength of 400 MPa, and an elongation of 10.2% at room temperature. The alloy has a yield strength of 173 MPa, a tensile strength of 245 MPa, and an elongation of 16% at 400° C.

Example 3

The present example provides a method for preparing a high-toughness heat-resistant aluminum alloy armature material comprising:
S1. Under the protection of high-purity argon, the aluminum ingot was heated and melted in an induction electric furnace to form aluminum liquid at a temperature of 760° C.
S2. The following elements in mass percentage were added to the aluminum liquid: Ce 8.00%, Y 7.50%, Zr 1.00%, Mg 1.50%, Er 0.50%, Fe 0.15%, Mn 0.05%, and Si 0.10%, with the content of other impurities being less than 0.1%; the contents of the elements were adjusted according to a preset composition; the mixture was subjected to degassing and deslagging to form alloy liquid, and then the formed alloy liquid was cast into an alloy ingot.
S3. The alloy ingot was processed into spherical alloy powder by using a gas atomization method and argon gas was introduced for gas protection at a working gas pressure of 8 MPa; the spherical powder has a particle size of 15 μm-53 μm, an average particle size of 50.6 μm, and a sphericity of more than 96%.
S4. The spherical alloy powder was subjected to rapid melting and solidification by selective laser melting and forming method; among them, the selective laser melting forming method adopted the following process parameters: laser power 330 W, scanning layer thickness 30 μm, and input energy density 70.4 J/mm³. The spherical alloy powder was rapidly melted and solidified to form a high-toughness heat-resistant aluminum alloy armature material. Nano-scale $Al_3(Y, Zr)$ and $Al_{11}Ce_3$ intermetallic compounds were formed in the aluminum matrix, which have a net-like skeleton structure and good thermal stability. The high-toughness heat-resistant aluminum alloy armature material has a density of more than 99.5% and a density of 2.85 g/cm³. It was tested to have a yield strength of 279 MPa, a tensile strength of 422 MPa, and an elongation of 10% at room temperature. The alloy has a yield strength of 185 MPa, a tensile strength of 270 MPa, and an elongation of 17% at 400° C.

Example 4

The present example provides a method for preparing a high-toughness heat-resistant aluminum alloy armature material comprising:
S1. Under the protection of high-purity argon, the aluminum ingot was heated and melted in an induction electric furnace to form aluminum liquid at a temperature of 770° C.
S2. The following elements in mass percentage were added to the aluminum liquid: Ce 6.00%, Y 9.50%, Zr 3.00%, Mg 0.60%, Sc 0.15%, Fe 0.20%, Mn 0.05%, and Si 0.10%, with the content of other impurities being less than 0.1%; the contents of the elements were adjusted according to a preset composition; the mixture was subjected to degassing and deslagging to form alloy liquid, and then the formed alloy liquid was cast into an alloy ingot.
S3. The alloy ingot was processed into spherical alloy powder by using a gas atomization method and argon gas was introduced for gas protection at a working gas pressure of 8 MPa; the spherical powder has a particle size of 16 μm-60 μm, an average particle size of 53.1 μm, and a sphericity of more than 98%.

S4. The spherical alloy powder was subjected to rapid melting and solidification by selective laser melting and forming method; among them, the selective laser melting forming method adopted the following process parameters: laser power 330 W, scanning layer thickness 20 μm, and input energy density 54.3 J/mm$^3$. The spherical alloy powder was rapidly melted and solidified to form a high-toughness heat-resistant aluminum alloy armature material. Nano-scale $Al_3(Y, Zr)$, $Al_3Sc$, and $Al_{11}Ce_3$ intermetallic compounds were formed in the aluminum matrix, which has a net-like skeleton structure and good thermal stability. The high-toughness heat-resistant aluminum alloy armature material has a density of more than 99.8% and a density of 2.88 g/cm$^3$. It was tested to have a yield strength of 350 MPa, a tensile strength of 450 MPa, and an elongation of 11.2% at room temperature. The alloy has a yield strength of 190 MPa, a tensile strength of 275 MPa, and an elongation of 16.5% at 400° C.

Example 5

The present example provides a method for preparing a high-toughness heat-resistant aluminum alloy armature material comprising:
S1. Under the protection of high-purity argon, the aluminum ingot was heated and melted in an induction electric furnace to form aluminum liquid at a temperature of 760° C.
S2. The following elements in mass percentage were added to the aluminum liquid: Ce 6.00%, Y 5.00%, Zr 3.00%, Mg 2.50%, Yb 0.25%, Sc 0.25%, Fe 0.15%, Mn 0.05%, and Si 0.10%, with the content of other impurities being less than 0.1%; the contents of the elements were adjusted according to a preset composition; the mixture was subjected to degassing and deslagging to form alloy liquid, and the formed alloy liquid was cast into an alloy ingot.
S3. The alloy ingot was processed into spherical alloy powder by using a plasma rotary electrode atomization method and argon gas was introduced for gas protection at a working speed of 50000 rpm; the spherical powder has a particle size of 15 μm-63 μm, an average particle size of 40.5 μm, and a sphericity of more than 99%.
S4. The spherical alloy powder was subjected to rapid melting and solidification by selective laser melting and forming method; among them, the selective laser melting forming method adopted the following process parameters: laser power 300 W, scanning layer thickness 30 μm, and input energy density 69.8 J/mm$^3$. The spherical alloy powder was rapidly melted and solidified to form a high-toughness heat-resistant aluminum alloy armature material. Nano-scale $Al_3(Y, Zr)$, $Al_3Yb$, $Al_3Sc$, and $Al_{11}Ce_3$ intermetallic compounds were formed in the aluminum matrix, which have a net-like skeleton structure and good thermal stability. The high-toughness heat-resistant aluminum alloy armature material has a density of more than 99.8% and a density of 2.79 g/cm$^3$. It was tested to have a yield strength of 287 MPa, a tensile strength of 445 MPa, and an elongation of 11% at room temperature. The alloy has a yield strength of 190 MPa, a tensile strength of 270 MPa, and an elongation of 16% at 400° C.

Example 6

The present example provides a method for preparing a high-toughness heat-resistant aluminum alloy armature material comprising:
S1. Under the protection of high-purity argon, the aluminum ingot was heated and melted in an induction electric furnace to form aluminum liquid at a temperature of 780° C.
S2. The following elements in mass percentage were added to the aluminum liquid: Ce 10.00%, Y 8.00%, Zr 0.50%, Mg 1.50%, La 0.50%, Yb 0.25%, Sc 0.25%, Fe 0.15%, Mn 0.05%, and Si 0.10%, with the content of other impurities being less than 0.1%; the contents of the elements were adjusted according to a preset composition; the mixture was subjected to degassing and deslagging to form alloy liquid, and then the formed alloy liquid was cast into an alloy ingot.
S3. The alloy ingot was processed into spherical alloy powder by using a gas atomization method and argon gas was introduced for gas protection at a working gas pressure of 10 MPa; the spherical powder has a particle size of 15 μm-53 μm, an average particle size of 46.6 μm, and a sphericity of more than 97%.
S4. The spherical alloy powder was subjected to rapid melting and solidification by selective laser melting and forming method; among them, the selective laser melting forming method adopted the following process parameters: laser power 260 W, scanning layer thickness 30 μm, and input energy density 89.5 J/mm$^3$. The spherical alloy powder was rapidly melted and solidified to form a high-toughness heat-resistant aluminum alloy armature material. Nano-scale $Al_3(Y, Zr)$, $Al_3Yb$, $Al_3Sc$, $Al_3La$, and $Al_{11}Ce_3$ intermetallic compounds were formed in the matrix, which have a net-like skeleton structure and good thermal stability. The high-toughness heat-resistant aluminum alloy armature material has a density of more than 99.8% and a density of 2.84 g/cm$^3$. It was tested to have a yield strength of 289 MPa, a tensile strength of 402 MPa, and an elongation of 12% at room temperature. The alloy has a yield strength of 180 MPa, a tensile strength of 275 MPa, and an elongation of 18% at 400° C.

In the above-mentioned examples, the strength and high-temperature stability of the heat-resistant aluminum alloy is improved by improving the preparation process and adjusting the alloy composition; the cooling rate of the selective laser melting process is very fast, and nano-scale intermetallic compounds such as $Al_{11}Ce_3$, $Al_3(Y, Zr)$, and/or $Al_3X$ with a net-like skeleton structure are formed; the heat stability is good; the aluminum matrix is coated or a substructure is formed in the matrix; the material has the features of high toughness, excellent electrical conductivity, wear resistance and ablation resistance, and high-temperature resistance, and the problems of softening and ablation during the operation of an armature material are solved.

The specific embodiments of the present disclosure have been described above. It should be understood that the present invention is not limited to the specific embodiments mentioned above. Those skilled in the art can make various variations or modifications within the scope of the claims, which does not affect the essence of the present invention.

What is claimed is:

1. A method for preparing aluminum alloy armature material comprising:
    S1, heating and melting an aluminum ingot into aluminum liquid under protection of an atmosphere at a temperature of 760° C.-780° C.;
    S2, adding the following elements in mass percentage to the aluminum liquid: Ce 6.00%-12.00%, Y 5.00%-9.50%, Zr 0.50%-3.00%, Mg 0.10%-2.50%, X 0.15%-2.50%, Fe 0.15%-0.25%, Mn 0.05%-0.15%, and Si 0.10%-0.50%, wherein a content of other impurities is less than 0.1%, and X is any one or a mixture of more selected from a group consisting of Yb, Er, La, and Sc; adjusting contents of the elements according to a preset composition, degassing and deslagging to form alloy liquid, and then casting the formed alloy liquid into an alloy ingot;
    S3, processing the obtained alloy ingot into spherical alloy powder; and
    S4, subjecting the spherical alloy powder to selective laser melting and solidification forming to produce nano-scale $Al_{11}Ce_3$, $Al_3(Y, Zr)$, and/or $Al_3X$ intermetallic compounds distributed in a net-like skeleton structure in an aluminum matrix, wherein the produced nano-scale $Al_{11}Ce_3$, $Al_3(Y, Zr)$, and/or $Al_3X$ intermetallic compounds are the aluminum alloy armature material.

2. The method according to claim 1, wherein in said S2, the following elements are added to the aluminum solution in mass percentage: Ce 8.00%-10.00%, Y 7.50%-9.50%, Zr 0.65%-1.00%, Mg 1.50%-2.50%, X 0.15%-0.50%, Fe 0.15%-0.20%, Mn 0.05%-0.10%, and Si 0.10%-0.25%, with the content of other impurities being less than 0.1%.

3. The method according to claim 1, wherein in said subjecting the spherical alloy powder to selective laser melting and solidification forming of S4, the following process parameters are adopted: laser power 260W-350W, scanning layer thickness 10 μm-30 μm, and input energy density 50J/mm$^3$-90J/mm$^3$.

4. The method according to claim 1, wherein in said processing the obtained alloy ingot into spherical alloy powder of S3, the alloy ingot is processed into spherical alloy powder by plasma rotary electrode atomization or gas atomization, and argon or helium gas is introduced for gas protection during the processing.

5. The method according to claim 4, wherein in said processing the obtained alloy ingot into spherical alloy powder by plasma rotary electrode atomization or gas atomization of S3, a rotation speed of the plasma rotary electrode atomization is 40000 rpm-50000 rpm; and
    a gas pressure of the gas atomization is 6MPa-10MPa.

6. The method according to claim 4, wherein in said processing the obtained alloy ingot into spherical alloy powder of S3, the spherical powder has a particle size of 15 μm-65 μm, an average particle size of 45 μm-55 μm, and sphericity of more than 95%.

* * * * *